(12) United States Patent
Llamas Sandín

(10) Patent No.: US 7,726,602 B2
(45) Date of Patent: Jun. 1, 2010

(54) ARRANGEMENT FOR MOUNTING AN ENGINE ON THE AIRFRAME OF AN AIRCRAFT

(75) Inventor: Raúl Carlos Llamas Sandín, Madrid (ES)

(73) Assignee: Airbus Espana, S.L., Madrid (ES)

( * ) Notice: Subject to any disclaimer, the term of this patent is extended or adjusted under 35 U.S.C. 154(b) by 278 days.

(21) Appl. No.: 11/998,991

(22) Filed: Dec. 3, 2007

(65) Prior Publication Data

US 2009/0090811 A1 Apr. 9, 2009

(30) Foreign Application Priority Data

Oct. 3, 2007 (ES) ................................. 200702585

(51) Int. Cl.
*B64D 35/00* (2006.01)
(52) U.S. Cl. ......................................... 244/54; 248/557
(58) Field of Classification Search .................. 244/54, 244/55; 248/554, 555, 552, 557; 60/39.31
See application file for complete search history.

(56) References Cited

U.S. PATENT DOCUMENTS

| 4,044,923 A | * | 8/1977 | Gardner ...................... 222/190 |
| 4,821,980 A | * | 4/1989 | Clausen et al. ................. 244/54 |
| 4,854,525 A | * | 8/1989 | Chee ............................ 244/54 |
| 5,064,144 A | * | 11/1991 | Chee ............................ 244/54 |
| 5,065,959 A | * | 11/1991 | Bhatia et al. ................... 244/54 |
| 5,443,229 A | * | 8/1995 | O'Brien et al. ................ 244/54 |
| 6,938,855 B2 | * | 9/2005 | Marche ....................... 244/54 |

* cited by examiner

*Primary Examiner*—Christopher P Ellis
(74) *Attorney, Agent, or Firm*—Ladas and Parry LLP

(57) ABSTRACT

Arrangement for mounting a propulsive system on an aircraft airframe by an external pylon which connects the engine with the airframe, the pylon 4 comprising a plurality of spars intruding into the airframe and units for attaching the spars to the internal airframe structure, the cited units being dampers, shock absorbers or active actuators with characteristics chosen so that the units are particularly suited for the efficient reduction of attachment and internal dynamic loads arising mainly but not only from hard landing events and aircraft flight manoeuvres, and for damping sustained vibrations of the propulsive system-airframe assembly, the arrangement allowing the easy removal of the pylon 4 from the rest of the airframe and the interchangeability of the pylon 4 between different aircrafts, being also the cited arrangement tolerant to damage or complete failure of at least one of the spars.

12 Claims, 2 Drawing Sheets

ARRANGEMENT FOR MOUNTING AN ENGINE ON THE AIRFRAME OF AN AIRCRAFT

FIELD OF THE INVENTION

The present invention discloses an arrangement for mounting an aircraft engine support structure on the airframe of said aircraft.

BACKGROUND OF THE INVENTION

Modern aircraft propulsive systems tend to have increasingly large by-pass ratios in order to achieve the high energetic efficiencies desirable for their operation. The said aircraft propulsive systems may be of the cowled type (like turbofans) or uncowled (including systems having propellers and those variously referred to as unducted fan engines (UDF), open rotor engines, prop-fans or high speed turboprop engines).

All the modern high by-pass engines used in the aircraft industry have a characteristically large diameter which imposes geometric constraints to their installation on the airframe, particularly when the propulsive system is mounted on the fuselage as a certain clearance must be maintained between the airframe and the engine cowl or open rotor blade tips, depending on whether the propulsive system is cowled or uncowled. In the case of fuselage mounted engines, aerodynamic considerations favour a concept of installation consisting on a single slender strut or pylon extending between the airframe and the engine. Examples of this engine mounting arrangement can be seen in patents U.S. Pat. No. 2,863,620 and U.S. Pat. No. 4,953,812, presenting specific design problems particularly in respect of the large static and dynamic loads that arise at the attachment of the pylon to the airframe.

There exist solutions in the state of the art which have the problem of presenting high structural discontinuities or apertures in the airframe, like it is described for example in document U.S. Pat. No. 5,065,959, which discloses a configuration of branch or yoke that does not allow the dismounting of the engine support structure or that needs big cuts in the airframe for allowing the dismounting of the structure. The possibility of dismounting the engine support structure is highly desirable for allowing the easy change of said support structure in the case of damage produced for example by engine FIRE or by the accidental impact of objects onto the support structure.

The present invention comes to solve the above-mentioned drawbacks.

SUMMARY OF THE INVENTION

The present invention describes a structural arrangement which provides means for mounting an engine to an aircraft which reduce the internal loads and the magnitude of the dynamic response of the airframe due to continuous engine and rotor vibration, aircraft manoeuvres and dynamic load cases. The said structural arrangement comprises at least one strut, or pylon, between the engine and the airframe. The said pylon includes a plurality of spars, at least three in a fail safe configuration, which are attached to the internal structure of the airframe by means of a plurality of damping elements.

The present invention provides also means to attach an engine to an airframe in such a way that the engine support structure can be easily removed from the airframe and at the same time reduces the dynamic response of the assembly and the static loads at the attachments due to the favourable geometry of the arrangement.

Other features and advantages of the present invention will be disclosed in the following detailed description of an illustrative embodiment of its object in relation to the attached figures.

DETAILED DESCRIPTION OF THE INVENTION

Figure 1:
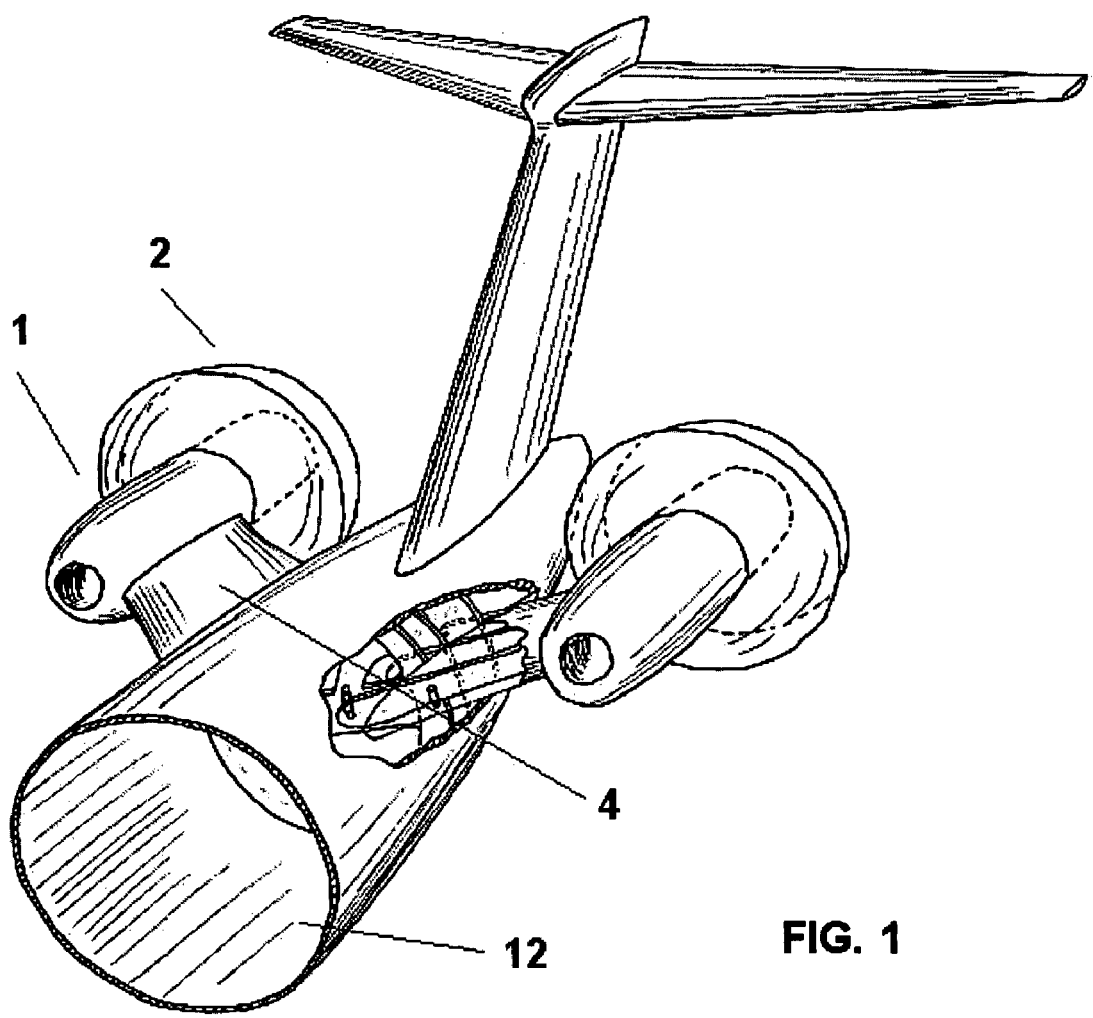
FIG. 1 shows a perspective schematic view of a rear fuselage mounted open rotor propulsive system illustrating the mounting arrangement according to the present invention.
Figure 2:
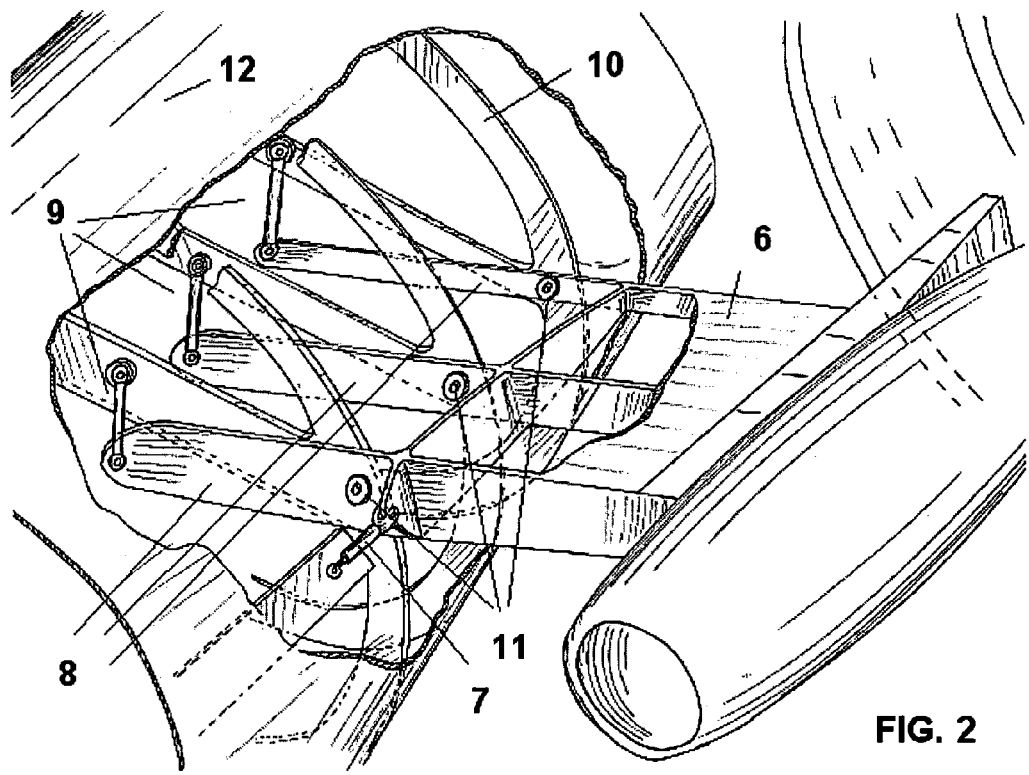
FIG. 2 shows a detailed side sectional view of the structural mounting arrangement on the aircraft airframe according to the present invention.

The installation of modern high by-pass engines, cowled or uncowled, on aircraft requires consideration of the large loads introduced in the airframe due to the dynamic response of the engine-pylon-airframe assembly to normal and emergency flight conditions. Consideration must also be given to the level of sustained vibration in the cabin during normal flight and also in such conditions as those produced in and after the event of losing one or more rotor blades in flight. The problems caused by the dynamic response can be particularly severe in the case of high by-pass engines due to the large centrifugal forces generated by the unbalanced rotation of the relatively heavy rotor blades at high speed. The rotor unbalance may be caused by damages in the blades by the impact of small debris during the normal operation of the aircraft or, in the extreme case, by the loss of one or more rotor blades. Moreover, the large diameter of the fan or open rotor of modern high by-pass engines requires the use of long struts, or pylons, for their mounting in the airframe which due to their own flexibility and the flexibility of the attachment result in the engine mounting assembly having resonant frequencies similar to those of the airframe. The effect of this similarity of natural frequencies is a possible and undesirable amplification of the dynamic loads due to normal flight manoeuvres, aircraft response to atmospheric turbulence or to dynamic landing loads, among other dynamic flight conditions.

The physical reason for the large magnitude of the static loads at the interface is that the bending moment produced by the mainly vertical forces at the engine centre of gravity must be balanced by a tensile force on one side of the pylon and a corresponding compressive force at the opposite side. The magnitude of the said force couple is equal to the magnitude of the vertical force at the engine centre of gravity times the distance between the engine and the pylon attachment to the fuselage divided by the effective distance between the load bearing elements on the upper and lower sides of the pylon, or pylon depth. In a typical application, considering a propulsive system weight of 5000 Kg, a distance between the engine C.G. and the side of the airframe of 2500 mm and a pylon depth of 500 mm, the magnitude of the force arising at each side of the pylon at the attachment point for a vertical acceleration of the airframe of 9 gs, this being one of the load cases corresponding to a dynamic landing which analysis is required by the aircraft certification authority, results after calculation in 2205000 Newton at each side of the pylon.

The obtained loads are substantial and require careful design of the pylon attachment and supporting fuselage internal structure in order to satisfy the static strength requirements with minimal weight and while satisfying any other design requirements, particularly the possibility of removing the pylon from the airframe and the tolerance to large structural damage to the pylon or its attachment to the airframe.

The calculation above does not consider dynamic effects, which in the case of heavy engines with large diameter rotors and mounted on long pylons pose a particular problem due to the potentially large response to transient excitations such as those produced by dynamic landings, flight manoeuvres and discrete atmospheric turbulence, which may increase the statically calculated loads by a large factor.

Also of concern in the presented engine installation concept is the response of the airframe and propulsive system assembly to sustained vibration produced by the inertial or aerodynamic imbalance of the rotating elements of the propulsive system.

On consideration of the transient response, it can be shown by simple analysis that for a typical open rotor engine mounted on a rear fuselage as described above, where the pylon attachment to the airframe is assumed to be a continuous structure and the airframe and pylon are designed using good aircraft design practise, the first natural frequencies of the vertical oscillation of the engine-pylon assembly are in the range from 10 Hz to 20 Hz. Existing transport aircraft carrying 100 to 200 passengers have natural frequencies of their first airframe vibration modes in the range from 2 Hz to 15 Hz. Therefore it can be seen that if certain modes of the airframe are excited which corresponding natural frequencies are similar to the frequency of vertical oscillation of the engine-pylon assembly, a large dynamic response of the propulsive system can be expected resulting in large attachment loads. As an illustrative measure of this effect it can be said that a well known result of the theory of the dynamics of systems of one degree of freedom (DoF) is that if the frequency of excitation is $\sqrt{2}*fn$ or $fn/\sqrt{2}$, being fn the natural frequency of a lightly damped 1dof system, the amplitude of the response is 2 times the amplitude of the excitation. Considering the above mentioned ranges of airframe and engine-pylon natural frequencies it is clear that dynamic amplification effects may increase very substantially the loads calculated above for the airframe-pylon interface for a dynamic landing case in which calculation dynamic response effects were not included.

Of high importance for the overall merit of the design of the airframe is its dynamic response, and that of the propulsive system installation, to sustained vibration induced by the rotating parts of the propulsive system. If the level of vibration is not very small it will be felt by the passengers and will cause discomfort. Moderate levels of sustained vibration may cause failure of aircraft systems and material fatigue in the metallic parts.

At high levels of vibrations such as those produced after the loss of one or more blades of the engine fan or open rotor, the transient dynamic loads may produce immediate structural failure. High levels of sustained vibration may produce structural failure by fatigue and/or failures of the aircraft control systems and/or even impair the pilots ability to read the instruments in the cockpit and operate the aircraft.

Low to moderate levels of vibration of the propulsive system may have their origin in small damages to the fan or open rotor blades caused by the input of small debris or other accidental damage during the operational life of the aircraft. The said blade damages may cause vibration due to the unbalanced centrifugal forces if there is a loss of blade mass or due to unbalanced aerodynamic forces caused by shape distortion of one or more blades.

Therefore, the present invention consists of a structural assembly configuration of the supporting structure 4 of a high bypass ratio engine 1 or an open rotor 2 engine on the fuselage 12 of an aircraft. The supporting structure 4 of the engine 1 comprises a closed structure part 6 outside the fuselage 12 and two or more essentially straight stringers 8 penetrating the fuselage 12 approximately perpendicular to its outer surface, connecting with the internal structure 10 of said fuselage 12 through several viscous dampers, elastic supports or actuators. Each of the spars 8 penetrating the fuselage 12 is supported on the inner structure 10 of the fuselage 12 at two points 11, 9 arranged essentially on the longitudinal axis of said spar 8, these points 11, 9 on the same spar 8 being spaced in the mentioned spar 8 such that they form an effective support with a large lever arm to react due to the mechanical moments produced by gravitational and inertial forces acting on the centre of gravity of the engine 1. One or more connecting members 7 additionally connect the closed supporting structure 6 of the engine 1 to the fuselage 12 such that they transmit the forces in the longitudinal direction of the airplane.

According to the configuration of the present invention, the connecting members 7, 9 and 11 are thus clustered in members 9 connecting the end of the spars 8 of the closed supporting structure 6 of the engine 1 with the internal structure 10 of the fuselage 12; which members 11 connect the mentioned spars 8 with the closed supporting structure 6 of the engine 1 at points of the mentioned spars 8 closest to the engine 1; and which members 7 connect the closed supporting structure 6 of the engine 1 to the fuselage 12 such that they transmit the forces in the longitudinal direction of the airplane. Connecting members 9 and 11 transmit forces essentially perpendicular to the longitudinal axis of the stringers 8, at least one of the two groups of connecting members 9 and 11 further transmitting forces essentially oriented along the longitudinal axis of said spars 8. The described arrangement of the connecting members 7, 9 and 11 according to the present invention is effective in restricting all the degrees of freedom of the engine 1 in relation to the airplane. The connecting members 7, 9 and 11 can be adjusted such that in normal conditions only a sufficient number of them transmit forces, such that the connection of the closed supporting structure 6 of the engine 1 to the fuselage 12 is statically determined, the rest of the connecting members transmitting forces only in the event of structural failure or breakage of other connecting members. It is also possible that several of the connecting members 7, 9 and 11 redundantly transmit forces in normal conditions, which requires that the geometry of the mentioned connecting members connecting the spars 8 to the internal structure 10 of the fuselage 12 can be adjusted.

The connecting members 7, 9 and 11 can be different types of those commonly used in aeronautics, formed by elastomers, wire mesh, viscoelastic type elements, electrohydraulic elements or any other type of element that allows transmitting the forces required between the spars 8 and the internal structure 10 of the fuselage 12, these members 7, 9 and 11 having the desired rigidity and dampening.

The connecting members 7, 9 and 11 can also be active insofar as their rigidity, dampening or elongation can be changed by an automatic control system regulating these mentioned features to obtain the desired dynamic response in every flight or landing condition.

The use of at least three spars 8 in the supporting structure 4 of the engine 1 makes the assembly concept redundant from a structural point of view, which is a certification requirement for airplanes, particularly in this case in which the supporting structure 4 of the engine 1, comprising the closed structure 6 and the spars 8, and or the inner structure 10 and/or the connecting members 9, 11 can be damaged by fragments of the engine 1 in the event the latter should explode.

One of the main added advantages of the configuration object of the present invention is furthermore the fact that it can be easily disassembled from outside the airplane without needing to have large structural gaps or openings in the fuselage 12. The possibility of being able to disassemble the supporting structure 4 of the engine 1 is highly desired so as to be able to easily change said supporting structure 4 in the event of damage caused, for example, by a fire in the engine 1 or by the accidental impact of objects on the mentioned supporting structure 4.

Figure 3:
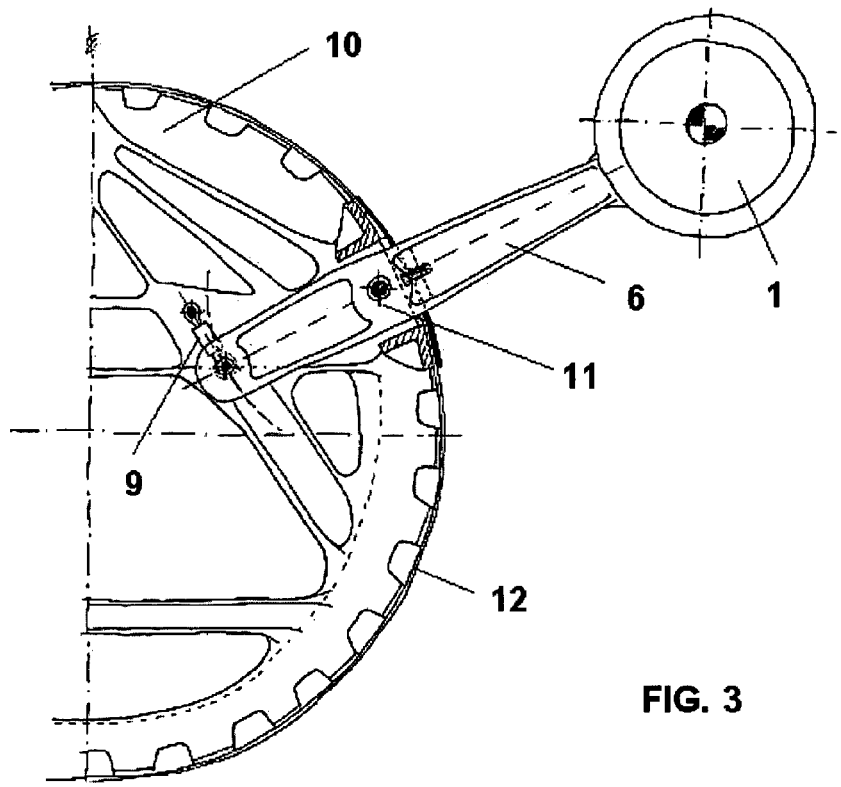
FIG. 3 shows a detailed sectional front view of the attachment of one of the pylon spars to the internal airframe structure according to the mounting arrangement of the present invention.

The configuration object of the present invention further has a geometry that allows spacing out the supporting points 9, 11 of the spars 8, as can be seen in FIG. 3, much more than in other known configurations without compromising the disassembly capacity, the rigidity of the supporting structure 4 of the engine 1 and preventing concentrations of stress in the spars 8 since there are no changes in the direction of the forces inside the spars 8, while further allowing the reduction of the internal loads in the fuselage 12 transmitted by the supporting structure 4 of the engine 1.

Any modifications comprised within the scope defined by the following claims can be introduced in the preferred embodiment just described.

The invention claimed is:

1. A structural configuration for the assembly of the supporting structure (4) of an aircraft engine (1) on the fuselage (12) of an aircraft, wherein the supporting structure (4) of the engine (1) comprises a closed structure part (6) outside the fuselage (12) and at least two spars (8) penetrating the fuselage (12) and connected to the internal structure (10) of said fuselage (12) through first and second connecting members (9, 11), said first members (9) connecting the end of the spars (8) to the internal structure (10) of the fuselage (12) and said second members (11) connecting the mentioned spars (8) to the internal structure (10) at the points of said spars (8) closest to the engine (1) thereby forming a lever arm such that the internal dynamic loads and the loads from the coupling of the supporting structure (4) to the engine (1), generated in cases of dynamic landings and in-flight aircraft maneuvers, are efficiently reduced, and the continuous vibrations in the engine assembly (1) and aircraft are further dampened.

2. A structural configuration for the assembly of the supporting structure (4) of an aircraft engine (1) on the fuselage (12) of an aircraft according to claim 1, wherein the spars (8) are straight and penetrate the fuselage (12) perpendicular to its outer surface (10).

3. A structural configuration for the assembly of the supporting structure (4) of an aircraft engine (1) on the fuselage (12) of an aircraft according to claim 1, wherein the connecting members (9, 11) are arranged on the longitudinal axis, said spars (8) being spaced such that they form an effective support with said large lever arm to react due to the mechanical moments produced by gravitational and inertial forces acting on the engine (1).

4. A structural configuration for the assembly of the supporting structure (4) of an aircraft engine (1) on the fuselage (12) of an aircraft according to claim 3, wherein the connecting members (9, 11) transmit forces perpendicular to the longitudinal axis of the spars (8), at least one of the connecting members (9, 11) further transmitting forces oriented along the longitudinal axis of said spars (8).

5. A structural configuration for the assembly of the supporting structure (4) of an aircraft engine (1) on the fuselage (12) of an aircraft according to claim 1, wherein the spars (8) are three in number so as to obtain a redundant and fail-safe structural configuration.

6. A structural configuration for the assembly of the supporting structure (4) of an aircraft engine (1) on the fuselage (12) of an aircraft according to claim 1, further comprising at least one additional connecting member (7) connecting the closed supporting structure (6) of the engine (1) to the fuselage (12) such that forces are transmitted in the longitudinal direction of the aircraft.

7. A structural configuration for the assembly of the supporting structure (4) of an aircraft engine (1) on the fuselage (12) of an aircraft according to claim 6, wherein the connecting members (7, 9, 11) are adjusted such that in normal conditions only a sufficient number of the connecting members transmit forces such that the connection of the closed supporting structure (6) of the engine (1) to the fuselage (12) is statically determined, the rest of the connecting members transmitting forces only in the event of structural failure or breakage of other connecting members.

8. A structural configuration for the assembly of the supporting structure (4) of an aircraft engine (1) on the fuselage (12) of an aircraft according to claim 6, wherein several of the connecting members (7, 9, 11) redundantly transmit forces in normal conditions, which requires that the geometry of the connecting members (7, 9, 11) connecting the spars (8) to the internal structure (10) of the fuselage (12) can be adjusted.

9. A structural configuration for the assembly of the supporting structure (4) of an aircraft engine (1) on the fuselage (12) of an aircraft according to claim 6, wherein the connecting members (7, 9 and 11) are formed by elastomers, wire mesh, viscoelastic type elements, or electrohydraulic elements that allow transmitting the forces required between the spars (8) and the internal structure (10) of the fuselage (12), these members (7, 9, 11) having the desired rigidity and dampening.

10. A structural configuration for the assembly of the supporting structure (4) of an aircraft engine (1) on the fuselage (12) of an aircraft according to claim 6, wherein the connecting members (7, 9, 11) are active such that their rigidity, dampening or elongation can be changed by an automatic control system regulating these features to obtain a desired dynamic response in every flight or landing condition.

11. A structural configuration for the assembly of the supporting structure (4) of an aircraft engine (1) on the fuselage (12) of an aircraft according to claim 1, wherein the connecting members (9, 11) can be spaced out on a spars (8) without compromising the disassembly capacity, the rigidity of the supporting structure (4) of the engine (1) and preventing concentrations of stress in the spars (8) since there are no changes in the direction of the forces inside the spars (8), while at the same time allowing the reduction of the internal loads in the fuselage (12) transmitted by the supporting structure (4) of the engine (1).

12. A structural configuration for the assembly of the supporting structure (4) of an aircraft engine (1) on the fuselage (12) of an aircraft according to claim 1, wherein the engine (1) is a high bypass ratio engine or an open rotor engine.

* * * * *